(12) United States Patent
Ceccarelli et al.

(10) Patent No.: US 11,509,588 B2
(45) Date of Patent: Nov. 22, 2022

(54) METHOD AND APPARATUS FOR SERVICE PROVISION IN A COMMUNICATION NETWORK

(71) Applicant: Telefonaktiebolaget LM Ericsson (publ), Stockholm (SE)

(72) Inventors: Daniele Ceccarelli, Sollentuna (SE); Marco Marchesini, Genoa (IT); Carlo Giovanni Perocchio, Genoa (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 29 days.

(21) Appl. No.: 17/059,299

(22) PCT Filed: May 30, 2018

(86) PCT No.: PCT/EP2018/064218
§ 371 (c)(1),
(2) Date: Nov. 27, 2020

(87) PCT Pub. No.: WO2019/228622
PCT Pub. Date: Dec. 5, 2019

(65) Prior Publication Data
US 2021/0218682 A1     Jul. 15, 2021

(51) Int. Cl.
  *H04L 47/2425*    (2022.01)
  *H04L 12/46*      (2006.01)
  *H04L 67/51*      (2022.01)

(52) U.S. Cl.
  CPC ...... *H04L 47/2425* (2013.01); *H04L 12/4641* (2013.01); *H04L 67/51* (2022.05)

(58) Field of Classification Search
  CPC .. H04L 47/2425; H04L 12/4641; H04L 67/16
  See application file for complete search history.

(56) References Cited

U.S. PATENT DOCUMENTS 8,804,747 B2 *  8/2014  Galles .................... H04L 47/10
                                                          370/399
8,955,100 B2    2/2015  Varadhan et al.
                    (Continued)

FOREIGN PATENT DOCUMENTS

WO       2018/133931 A1      7/2018

OTHER PUBLICATIONS

International Search Report and Written Opinion issued in International Application No. PCT/EP2018/064218 dated Feb. 11, 2019 (13 pages).

(Continued)

*Primary Examiner* — Sm A Rahman
(74) *Attorney, Agent, or Firm* — Rothwell, Figg, Ernst & Manbeck, P.C.

(57) ABSTRACT

A method (100) for managing the provision of a service between origin and destination endpoints over a communication network is disclosed. The communication network comprises at least two Autonomous Systems (ASs) and an Abstraction and Control of Traffic Engineered Networks Virtual Network (VN) between the origin and destination endpoints. The method comprises defining, at each of the origin and destination endpoints, a service segregation loopback interface corresponding to a subset of traffic belonging to the service (110). The method further comprises binding the subset of traffic to the VN by exposing the service segregation loopback interface defined at the destination endpoint as routing next hop only to traffic belonging to the subset (120).

21 Claims, 13 Drawing Sheets

(56) References Cited

U.S. PATENT DOCUMENTS

| | | | | |
|---|---|---|---|---|
| 10,432,523 | B2* | 10/2019 | Vairavakkalai | H04L 45/02 |
| 2018/0109450 | A1* | 4/2018 | Filsfils | H04L 45/04 |
| 2019/0313167 | A1* | 10/2019 | Lee | H04L 41/5051 |

OTHER PUBLICATIONS

A. Galis (Editor) et al., "Network Slicing—Revised Problem Statement draft-galis-netslices-revised-problem-statement-01", No Working Group, Internet Engineering Task Force, IETF, No. 1, Jul. 2017 (pp. 1-29).

Lee (Editor) Dhruv Dhody et al., "A Yang Data Model for ACTN VN Operation" draft-lee-teas-actn-vn-yang-08, Internet-Draft: Teas Working Group, Internet Engineering Task Force, IETF, No. 8, Oct. 2017 (pp. 1-30).

A. Galis et al., "Autonomic Slice Networking draft-galis-anima-autonomic-slice-networking-03", Internet-Draft Network Working Group, Internet Engineering Task Force, IETF, No. 3, Nov. 2017 (pp. 1-23).

* cited by examiner

METHOD AND APPARATUS FOR SERVICE PROVISION IN A COMMUNICATION NETWORK

CROSS REFERENCE TO RELATED APPLICATION(S)

This application is a 35 U.S.C. § 371 National Stage of International Patent Application No. PCT/EP2018/064218, filed May 30, 2018, designating the United States.

TECHNICAL FIELD

The present disclosure relates to a method for managing the provision of a service between origin and destination endpoints over a communication network, the communication network comprising at least two Autonomous Systems (ASs). The present disclosure also relates to a management element for managing the provision of a service between origin and destination endpoints over such a communication network and to a computer program product configured, when run on a computer, to carry out a method for managing the provision of a service between origin and destination endpoints over such a communication network.

BACKGROUND

Software Defined Networking (SDN) of transport networks is increasing in popularity, with operators beginning to deploy SDN based solutions for single domain management in transport networks. Abstraction of network resources is a technique that can be applied to a single network domain or across multiple domains to create a single virtualized network that is under the control of a network operator or the customer of the operator. Abstraction and Control of Traffic Engineered Networks (ACTN) is an initiative standardised in various IETF drafts with the aim of facilitating resource abstraction in multi technology and multi-vendor transport networks. In ACTN terminology, an SDN based solution for single domain management in transport networks is referred to as a Physical Network Controller (PNC) controlled domain. The driver for the introduction of SDN in transport networks is to provide network operators with Traffic Engineering (TE) capabilities in terms of constraints to be applied to the routing of traffic in the network. Such capabilities may include for example computing paths with minimum delay, minimum cost etc.

Service providers offer to their customers services built on top of, and transported via, the tunnels defined in transport networks. The tunnels themselves do not form part of the customer offering, but rather the services built on top of the tunnels. There is therefore a need to bind the overlay services provided to customers to particular tunnels that will transport the service traffic in accordance with constraints to be applied to the service. Such overlay services may include for example Layer 3 and Layer 2 Virtual private Networks (L3VPNs and L2VPNs). This requirement is very common for L3VPN services, according to which Virtual Routing Functions (VRFs) are defined on Provider Edge (PE) nodes and it is required to bind a VPN to a given VRF and to bind a VRF to a given tunnel. This situation is illustrated in FIG. 1, according to which a request is received for VPN A1 2 between PE X1 4 and PE Y1 6 with minimal delay. The transport network between PE X1 4 and PE Y1 6 includes transport nodes 8. Supposing that the path with minimal delay is the path going through nodes PE X1-P1-P2-P3-P4-PE Y1, a mechanism is required to bind VPN A1 2 to that particular tunnel. Such a mechanism exists and different vendors implement it in different ways, but most commercial nodes allow for binding between a VRF and a given tunnel.

Existing solutions function effectively in a single network domain; that is in situations in which the Customer Edge (CE) nodes of the VPN are connected to PE nodes belonging to the same Autonomous System (AS). This is the situation illustrated in FIG. 1, but this situation is in fact just a small subset of actual deployment situations in customer networks, according which it is usual for multiple ASs to be crossed by the traffic belonging to a single VPN, meaning that the CE nodes of the VPN are connected to PE nodes belonging to different ASs. In multi domain scenarios, there is therefore no single end to end tunnel, that is there is no single entity connecting the origin and destination PE nodes for a VPN, only tunnels within each domain and mechanisms to forward the traffic from one domain to another. In order to provide end to end constraints against a VPN, it is necessary to guarantee that the traffic for this service is bound to a specific path in each domain. Using existing techniques it is possible force the VPN traffic to use a particular tunnel in the first AS by binding the VPN to a VRF at the first PE node and binding the VRF to the desired tunnel. However, once the traffic is delivered from the Autonomous System Border Router (ASBR) of the first AS to an ASBR of a neighbouring AS, there is no way to tell the ASBR of the neighbouring AS which tunnel to use in order to reach the destination PE node.

A further challenge in the provision of services over a transport network is that in many cases, it is desirable to be able to treat different traffic for a single service in a different way. An example of such a situation is illustrated in FIG. 2, which shows a transport network comprising three ASs 10, 12, 14. A VPN (VPN 1 in FIG. 2) may be leased to a customer which requires different types of traffic within the VPN to be treated differently. In the illustrated example some traffic, illustrated as VPN 1A 16, is required to be routed along the shortest path, other traffic, such as voice traffic illustrated as VPN 1B 18, is required to be routed along the path within minimal delay, while still other traffic, video traffic illustrated as VPN 1C 20, is required to be routed over a path with high bandwidth availability.

A further example situation in which traffic for a single service may be required to be treated differently is illustrated in FIG. 3. In the example of FIG. 3, traffic for the service VPN 1 is required to be mapped to different tunnels within the three ASs 10, 12, 14 on a type of subscriber basis. In the illustrated example, subscribers using a public IP address 22 are required to be routed to the internet, while subscribers using a private IP address 24 are required to be routed through various functions 26, including for example Network Address Translation (NAT), Service Aware Support Node (SASN), Managed Service Provider (MSP) etc.

The situations illustrated in FIGS. 2 and 3 could be managed for example by using a dedicated VPN for each type of traffic or by aggregating traffic on the Customer Edge nodes. However, both of these approaches would involve significant waste of resources. Dedicated VPNs would also cause significant scalability issues as the number of VPN instances in the network would increase significantly, and commercial nodes are only able to handle some thousands of VPNs. The scalability issues for aggregation on CE nodes would be greater still, as there would be a need to provide a dedicated physical port per VPN on the Provider Edge nodes.

SUMMARY

It is an aim of the present invention to provide a method, apparatus and computer readable medium which at least partially address one or more of the challenges discussed above.

According to a first aspect of the present disclosure, there is provided a method for managing the provision of a service between origin and destination endpoints over a communication network, the communication network comprising at least two Autonomous Systems (ASs) and an Abstraction and Control of Traffic Engineered Networks (ACTN) Virtual Network (VN), between the origin and destination endpoints. The method comprises defining, at each of the origin and destination endpoints, a service segregation loopback interface corresponding to a subset of traffic belonging to the service, and binding the subset of traffic to the VN by exposing the service segregation loopback interface defined at the destination endpoint as routing next hop only to traffic belonging to the subset.

For the purposes of the present specification, the term "exposing", refers to the process of enabling the subject interface to be accessed, as discussed in further detail below.

According to examples of the present disclosure, the method may further comprise defining an ACTN VN between the origin and destination endpoints, the VN comprising a specified tunnel in each of the ASs, and defining, at each egress node of each tunnel in the VN, a loopback interface that corresponds to the VN and is specific to the particular tunnel.

According to examples of the present disclosure, binding the subset of traffic to the VN may further comprise using a Routing Policy to expose the loopback interface corresponding to the VN, and defined at the egress node corresponding to the destination endpoint, as routing next hop for traffic belonging to the service and having the service segregation loopback interface defined at the destination endpoint as its destination.

According to examples of the present disclosure, defining at each of the origin and destination endpoints a service segregation loopback interface corresponding to a subset of traffic belonging to the service may comprise creating each service segregation loopback interface on a Virtual Routing Function (VRF) which corresponds to the service and which is defined on the relevant origin or destination endpoint.

According to examples of the present disclosure, the subset of traffic belonging to the service may be identified by routing constraints for the subset of traffic that are specific to the subset of traffic.

According to examples of the present disclosure, the routing constraints may be determined by at least one of a class of service to be guaranteed for the traffic and/or a type of subscriber generating the traffic. Examples of routing constraints may include shortest path, minimum delay, high bandwidth and/or a requirement to pass through certain functions such as NAT, SASN, MSP etc.

According to examples of the present disclosure, the operation of exposing may comprise exposing the loopback interface to AS border nodes in the AS of the destination endpoint.

According to examples of the present disclosure, binding the subset of traffic to the VN may further comprise using a Routing Policy to expose the loopback interface defined at the egress node of a tunnel in an AS adjacent to the AS of the destination endpoint as routing next hop for traffic having the loopback interface defined at the egress node corresponding to the destination endpoint as its destination.

According to examples of the present disclosure, the above operation of exposing may comprise exposing the loopback interface to AS border nodes in the AS adjacent to the AS of the destination endpoint.

According to examples of the present disclosure, exposing loopback interfaces may comprise exposing the interfaces via Border Gateway Protocol (BGP) signalling According to examples of the present disclosure, binding the subset of traffic to the VN may further comprise using the defined loopback interfaces as tunnel endpoints for traffic routing within each individual AS.

According to examples of the present disclosure, using the defined loopback interfaces as tunnel endpoints for traffic routing within each individual AS may comprise using RSVP-TE capabilities to create the tunnels.

According to examples of the present disclosure, binding the subset of traffic to the VN may further comprise engineering the tunnels within each individual AS with routing satisfying Service Level Agreement (SLA) requirements applicable to the subset of traffic.

According to examples of the present disclosure, the service may comprise a Virtual Private Network (VPN).

According to examples of the present disclosure, the method may further comprise defining a plurality of ACTN VNs between the origin and destination endpoints, each VN comprising a specified tunnel in each of the ASs, and defining, at each egress node of each tunnel in each VN, a loopback interface that corresponds to the VN and is specific to the particular tunnel, and defining at each of the origin and destination endpoints a plurality of service segregation loopback interfaces, such that a service segregation loopback interface corresponding to each one of a plurality of subsets of traffic belonging to the service is defined at each of the origin and destination endpoints. The method may further comprise binding each subset of traffic to a specific one of the VNs by, for each subset of traffic, exposing the service segregation loopback interface corresponding to the subset, and defined at the destination endpoint, as routing next hop only to traffic belonging to the subset.

According to examples of the present disclosure, binding each subset of traffic to a specific VN further may comprise, for each subset of traffic, using a Routing Policy to expose the loopback interface corresponding to the VN to which the subset is to be bound, and defined at the egress node corresponding to the destination endpoint, as routing next hop for traffic belonging to the service and having the service segregation loopback interface corresponding to the subset and defined at the destination endpoint as its destination.

According to examples of the present disclosure, the method may further comprise defining a plurality of ACTN VNs between the origin and destination endpoints, each VN comprising a specified tunnel in each of the ASs, and defining, at each egress node of each tunnel in each VN, a loopback interface that corresponds to the VN and is specific to the particular tunnel. The method may further comprise managing the provision of an additional service between the origin and destination endpoints by binding the additional service to a specific one of the VNs by: exposing the loopback interface corresponding to the VN to which the service is to be bound and defined at the egress node corresponding to the destination endpoint as routing next hop only to traffic corresponding to the additional service.

According to examples of the present disclosure, binding the additional service to a specific one of the VNs may further comprise using a Routing Policy to expose the loopback interface corresponding to the VN to which the service is to be bound and defined at the egress node corresponding to the destination endpoint as routing next hop for traffic having that loopback interface as its destination.

According to another aspect of the present disclosure, there is provided a computer program comprising instructions which, when executed on at least one processor, cause the at least one processor to carry out a method according to any one of the preceding aspects or examples of the present disclosure.

According to another aspect of the present disclosure, there is provided a carrier containing a computer program according to the preceding aspect of the present disclosure, wherein the carrier comprises one of an electronic signal, optical signal, radio signal or computer readable storage medium.

According to another aspect of the present disclosure, there is provided a computer program product comprising non-transitory computer readable media having stored thereon a computer program according to a preceding aspect of the present disclosure.

According to another aspect of the present disclosure, there is provided a management element for managing the provision of a service between origin and destination endpoints over a communication network. The communication network comprises at least two Autonomous Systems (ASs) and an Abstraction and Control of Traffic Engineered Networks (ACTN) Virtual Network (VN) between the origin and destination endpoints. The management element is adapted to define at each of the origin and destination endpoints a service segregation loopback interface corresponding to a subset of traffic belonging to the service, and bind the subset of traffic to the VN by exposing the service segregation loopback interface defined at the destination endpoint as routing next hop only to traffic belonging to the subset.

According to examples of the present disclosure, the management element may be further adapted to carry out a method according to any one of the preceding aspects or examples of the present disclosure.

According to another aspect of the present disclosure, there is provided a management element for managing the provision of a service between origin and destination endpoints over a communication network. The communication network comprises at least two Autonomous Systems (ASs) and an Abstraction and Control of Traffic Engineered Networks (ACTN) Virtual Network (VN) between the origin and destination endpoints. The management element comprises a processor and a memory, the memory containing instructions executable by the processor such that the management element is operable to define at each of the origin and destination endpoints a service segregation loopback interface corresponding to a subset of traffic belonging to the service, and bind the subset of traffic to the VN by exposing the service segregation loopback interface defined at the destination endpoint as routing next hop only to traffic belonging to the subset.

According to examples of the present disclosure, the management element may be further operable to carry out a method according to any one of the preceding aspects or examples of the present disclosure.

BRIEF DESCRIPTION OF THE DRAWINGS

For a better understanding of the present invention, and to show more clearly how it may be carried into effect, reference will now be made, by way of example, to the following drawings in which.

DETAILED DESCRIPTION

Aspects of the present disclosure provide a method according to which a subset of traffic belonging to a service may be bound to individual tunnels forming an end to end path in a multi-domain transport network. Examples of the method use the concept of an ACTN Virtual Network (VN) to identify an end to end path comprising a different tunnel in each domain of the transport network, each domain operating as a distinct AS. Service segregation loopback interfaces are defined at origin and destination endpoints for the service, the service segregation loopback interfaces corresponding to the subset of traffic. The subset of traffic may then be bound to a defined VN using the service segregation loopback interfaces, which binding translates as a binding to each individual tunnel comprised within the VN in the different domains.

International patent application number PCT/EP2017/050994 discloses a method according to which a service such as a L3 VPN may be bound to an ACTN VN, and consequently to the individual Traffic Engineered tunnels forming the ACTN VN. In particular, the method disclosed in PCT/EP2017/050994 allows for binding of the service in multiple domains, a situation in which it is very complex to force the traffic to cross domain boundaries using a given ASBR (Autonomous System Border Node), or to reiterate the binding on all the ingress nodes of the domains to be crossed. A brief summary of the method proposed in PCT/EP2017/050994 is provided below, with reference to FIGS. 4 to 6.

Figure 4:
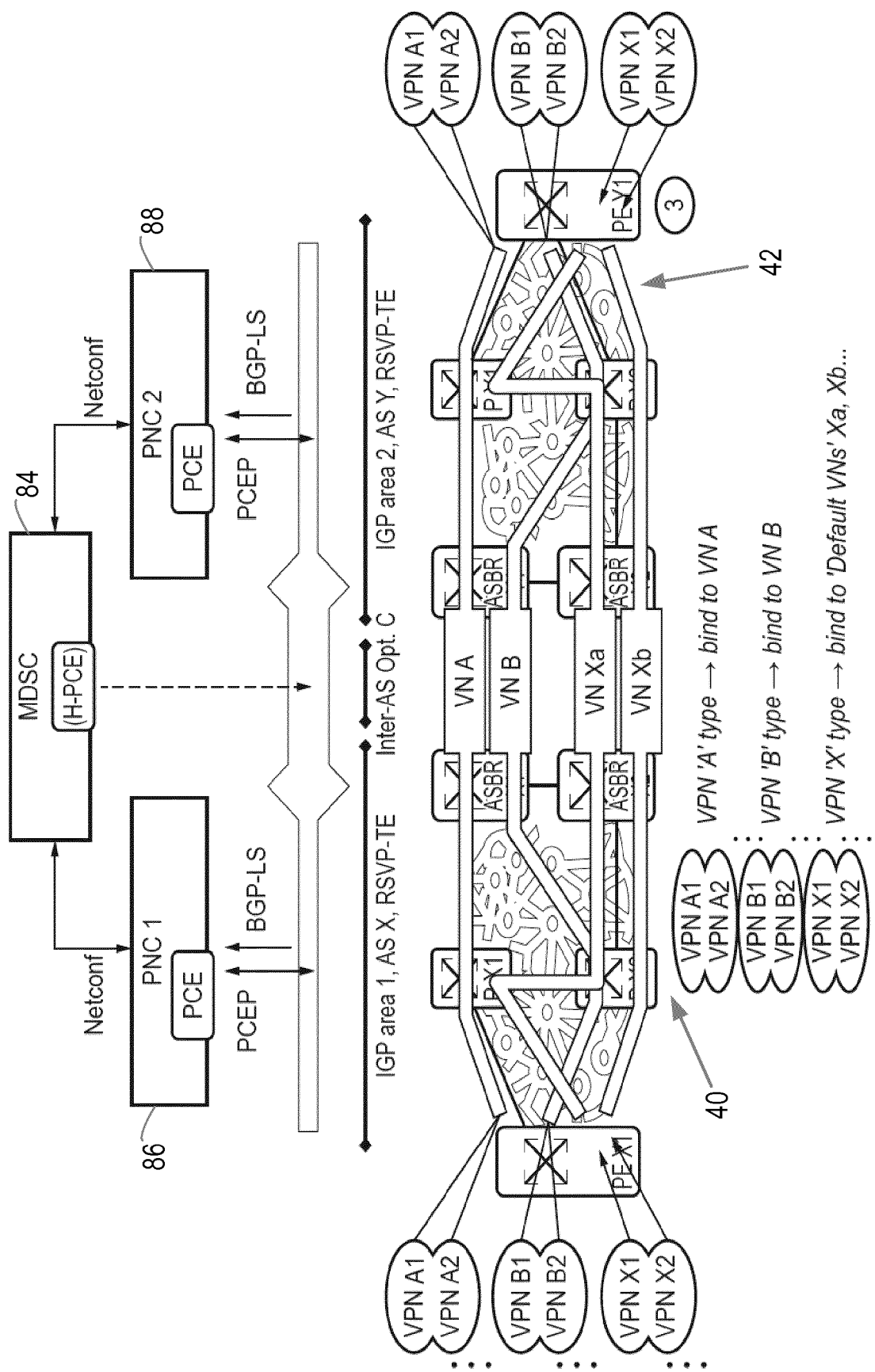
FIG. 4 illustrates service to tunnel binding in a multi-domain transport network.

FIG. 4 illustrates service to tunnel binding in an example multi domain transport network. As illustrated in FIG. 4, the multi domain transport network comprises multiple IP/MPLS domains 40, 42 connected using Inter AS option C, also known as seamless MPLS. In the illustrated example, a Multi Domain Service Coordinator (MDSC) 84 coordinates the end to end service and tunnel provisioning and is in communication with a dedicated PNC 86, 88 for each domain. Tunnels within each domain may be created by any means including for example RSVP-TE, segment routing, NMS etc. The different domains are managed as different ASs, each with its own routing instance including for example ISIS-TE or OSPF-TE. Border Gateway Protocol Label Unicast (BGP-LU) is used for the signalling of the transport layer between the different domains. As illustrated in the Figure, examples of the methods disclosed in PCT/EP2017/050994 enable the binding of VPN A1 and VPN A2 to the ACTN VN A, VPN B1 and VPN B2 to ACTN VN B and VPN X1 and VPN X2 to "default" ACTN VNs Xa and Xb.

Figure 5:
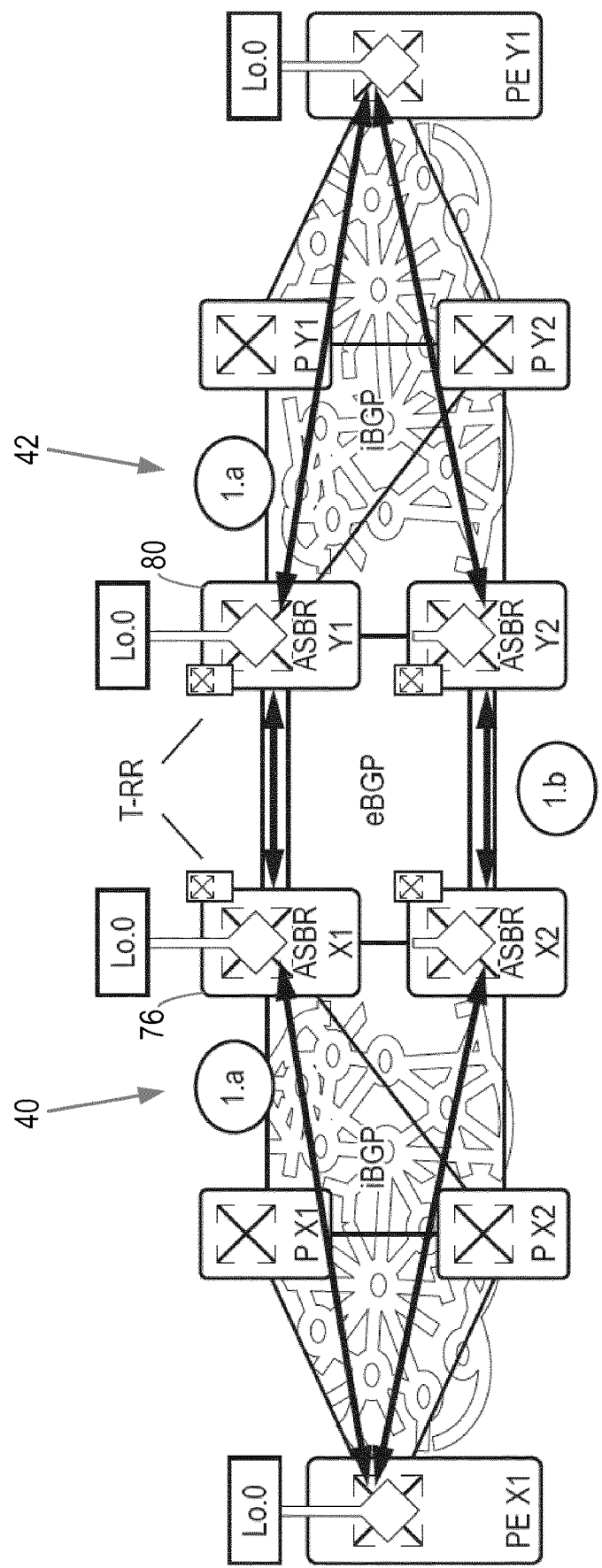
FIG. 5 illustrates transport loopback interface creation in the multi-domain transport network of FIG. 4.
Figure 6:
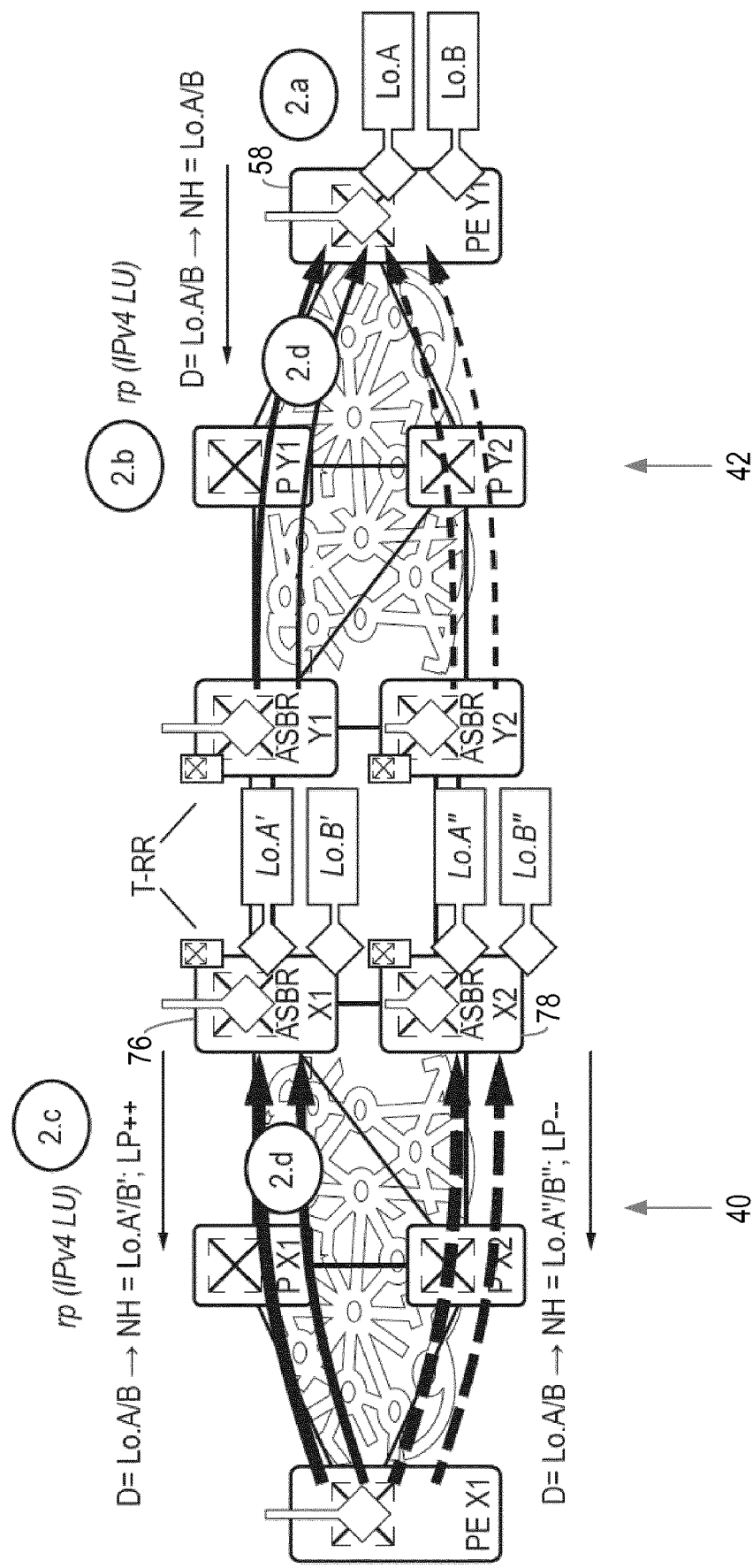
FIG. 6 illustrates loopback interface creation and propagation in the multi-domain transport network of FIG. 4.

As illustrated in FIG. 5, transport loopback interfaces (Lo.0) may be used for the setup and the management of the IP/MPLS infrastructure, using Interior Gateway Protocol (IGP), RSVP and interior BGP (iBGP) protocols as illustrated in steps 1.*a* and 1.*b* of FIG. 5.

The method of PCT/EP2017/050994 achieves binding of a service to an ACTN VN through the definition and propagation of loopback interfaces corresponding to a service such as a VPN. Loopback interfaces are defined for each different ACTN VN, with one loopback interface defined on each egress node of each tunnels in the VN. The loopback interfaces correspond to the VN and each is specific to the particular tunnel on which it is defined. In the transport network of FIG. 6, loopback interface Lo.A' is defined on ASBR X1 76 and loopback interface Lo.A is defined on the destination PE node PE Y1 58 for VN A. Each loopback interface corresponds to the ACTN VN VN A but they are differentiated by the use of a ' (prime) symbol, such that each loopback interface is specific to the particular tunnel at the egress of which it is defined. Equivalent loopback interfaces are defined for VN B, with Lo.B' defined at ASBR X1 76 and Lo.B defined at destination PE node PE Y1 58. Lo.A' and Lo.B' at ASBR X1 76 may be used to force traffic onto the correct tunnel in the first domain 40 and Lo.A and Lo.B may be used to force traffic onto the correct tunnel in the second domain 42. Loopback interfaces Lo.A" and Lo.B" may be defined at ASBR X2 78 to provide an end to end BGP FRR driven recovery mechanism for the traffic in the event of a failure on the primary path.

A PNC or MDSC may configure the destination PE node PE Y1 58 such that the defined loopback interfaces at the node, Lo.A and Lo.B, are announced into the network via a regular BGP network statement with send label request (BGP LU). This is illustrated at 2.*a* in FIG. 8. The PNC or MDSC then forces the exposure of Lo.A and Lo.B as BGP next hop via a Routing Policy on IPv4 Labelled Unicast (LU) address family. On the ASBR nodes, the Routing Policy on IPv4 LU (match on destination) is set to expose the ASBR's loopback interfaces Lo.A and Lo.B as BGP next hop for the remote PE node.

PCT/EP2017/050994 thus discloses a method allowing for the binding of a VPN or other service to an ACTN VN. A challenge remains to allow for different handling of different traffic within a service such as a VPN. Aspects of the present disclosure provide a method according to which a subset of traffic belonging to a service may be bound to individual tunnels forming an end to end path in a multi-domain transport network. An example of such a method is illustrated in FIG. 7.

Figure 7:
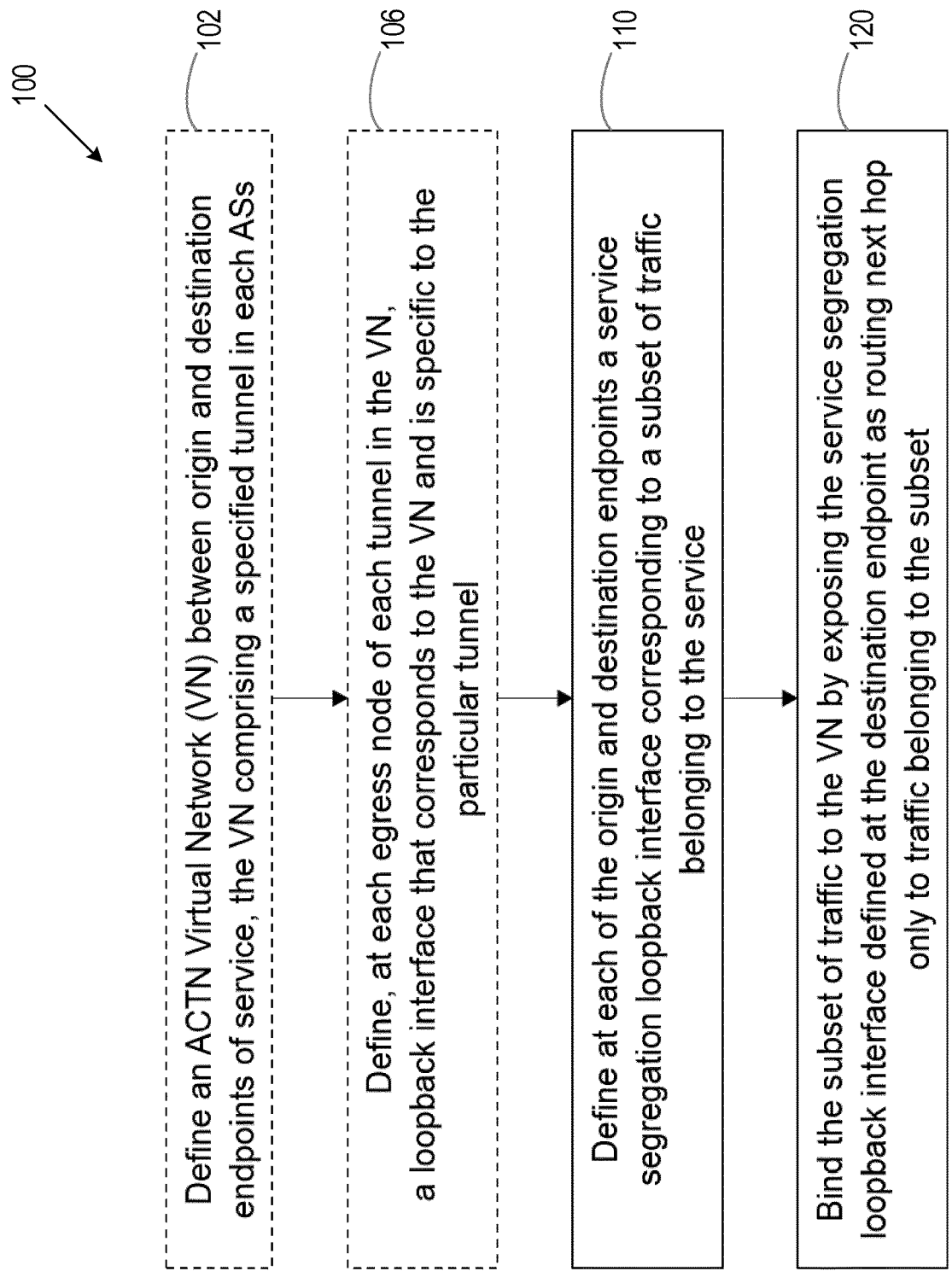
FIG. 7 illustrates process steps in a method for managing the provision of a service between origin and destination endpoints over a communication network.

FIG. 7 illustrates a first example of a method 100 for managing the provision of a service between origin and destination endpoints over a communication network. The communication network comprises at least two ASs and an ACTN VN between the origin and destination endpoints. The VN comprises a specified tunnel in each of the ASs, and each tunnel in the VN comprises, at each egress node of the tunnel, a loopback interface that corresponds to the VN and is specific to the particular tunnel. In some examples of the present disclosure, the method 100 may comprise the steps of establishing this architecture, by defining the ACTN VN in step 102 and defining the loopback interfaces corresponding to the VN in step 106. In other examples, such architecture may already exist, such as if examples of the methods disclosed in PCT/EP2017/050994 have been carried out. Referring to FIG. 7, the method comprises, in a first step 110, defining, at each of the origin and destination endpoints, a service segregation loopback interface corresponding to a subset of traffic belonging to the service. The method further comprises, in step 120, binding the subset of traffic to the VN by exposing the service segregation loopback interface defined at the destination endpoint as routing next hop only to traffic belonging to the subset. Aspects of the present disclosure thus introduce an additional layer of differentiation when compared to the methods of PCT/EP2017/050994. The definition and exposing of service segregation loopback interfaces allows for the binding to an ACTN VN of a subset of traffic belonging to a service, such that different subsets of traffic belonging to the same service may be bound to different ACTN VNs.

Figure 1:
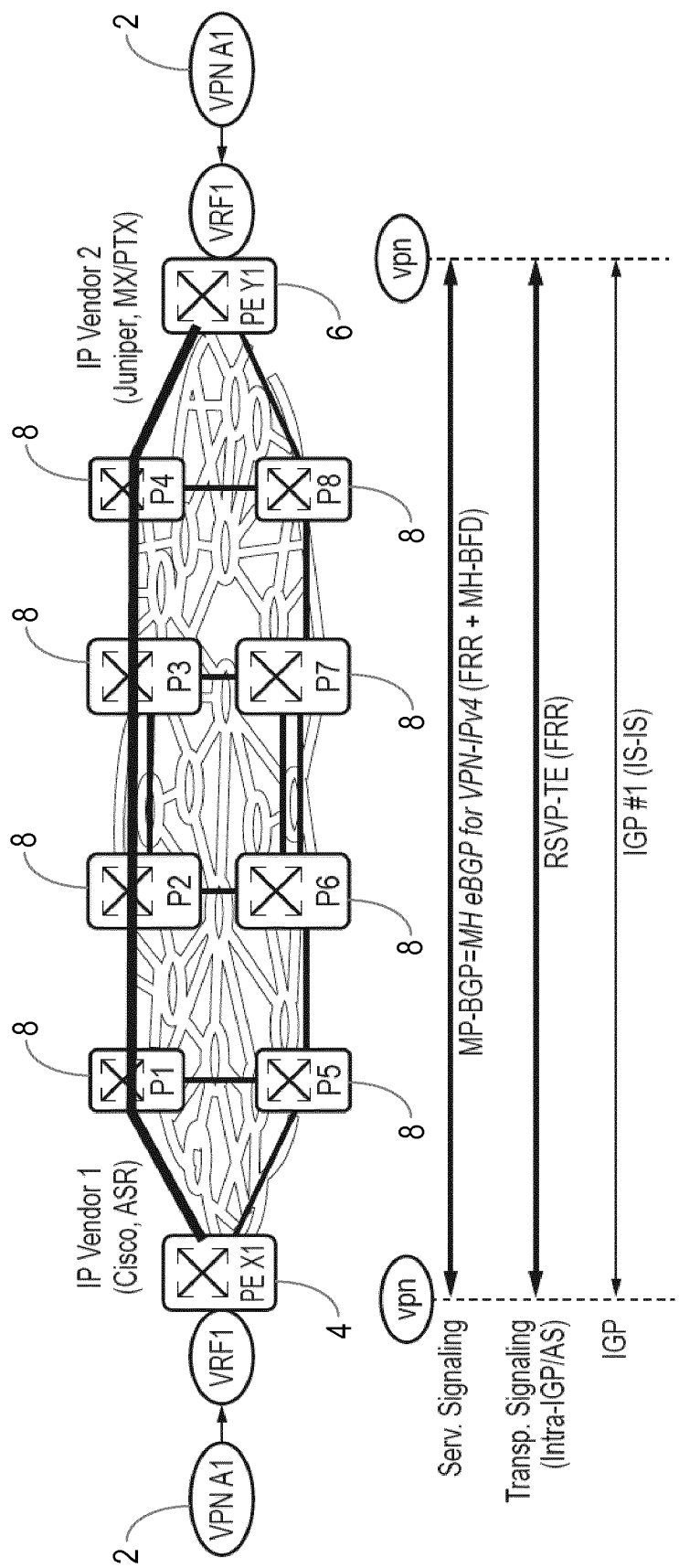
FIG. 1 illustrates service to tunnel binding in a single domain of a transport network.
Figure 2:
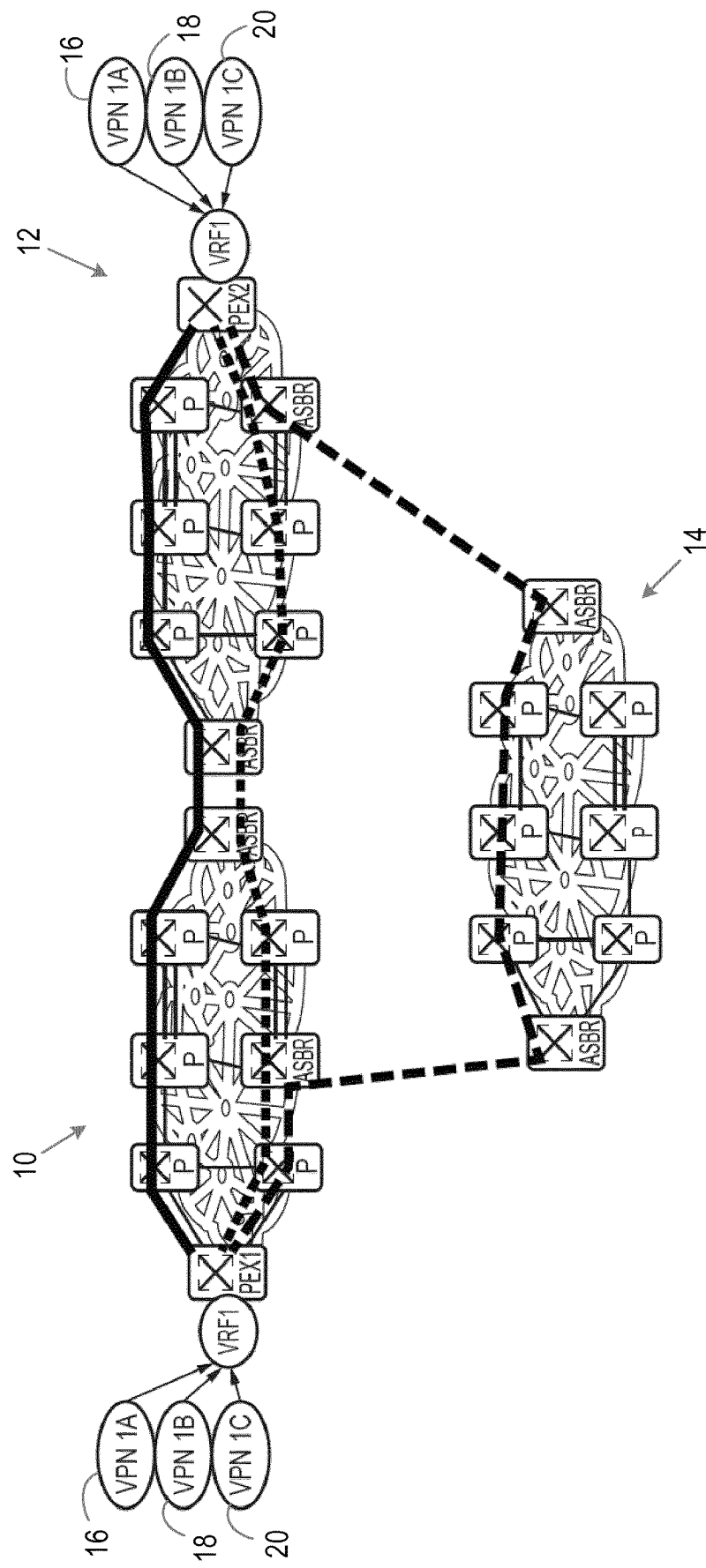
FIGS. 2 and 3 illustrate scenarios for routing traffic of a single VPN over multiple paths on a multi-domain transport network.
Figure 3:
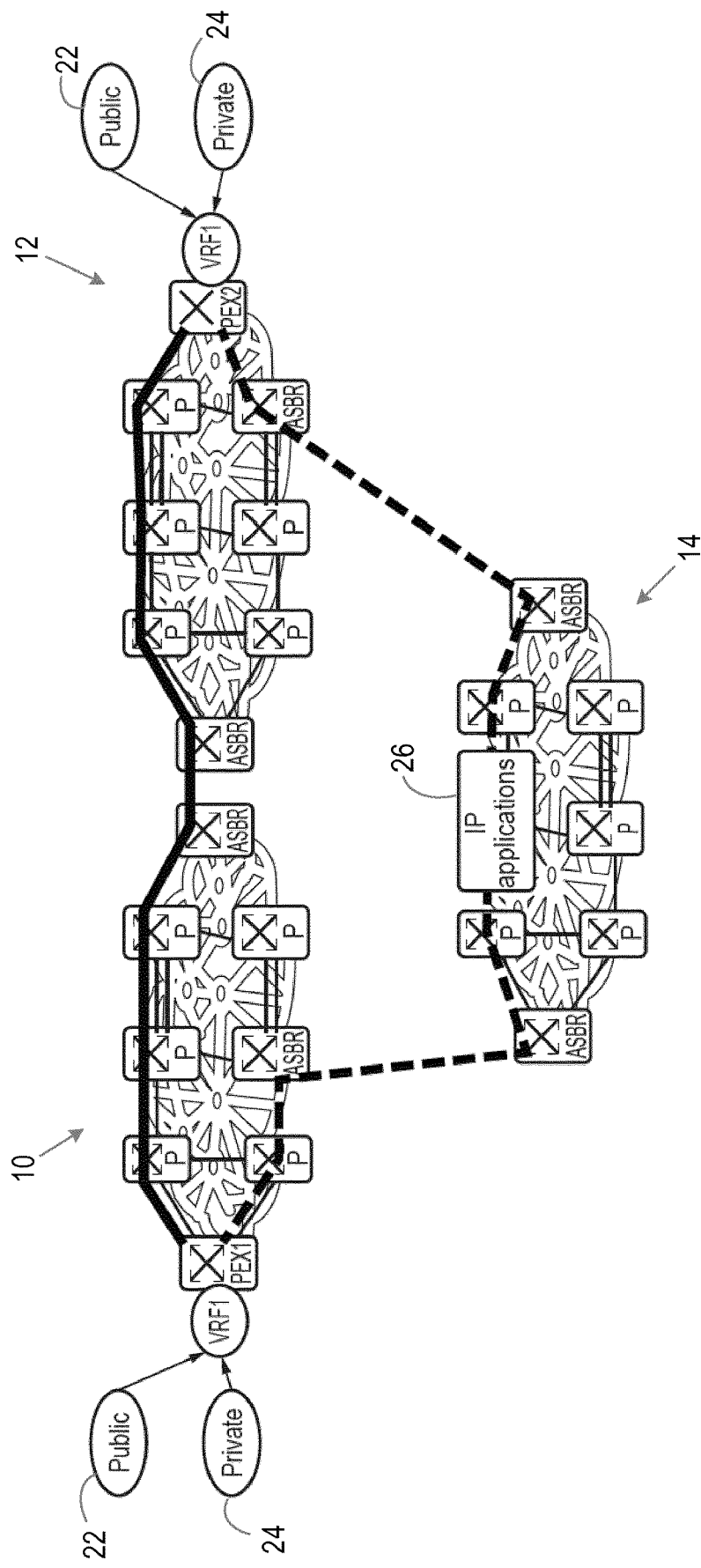
Figure 8A:
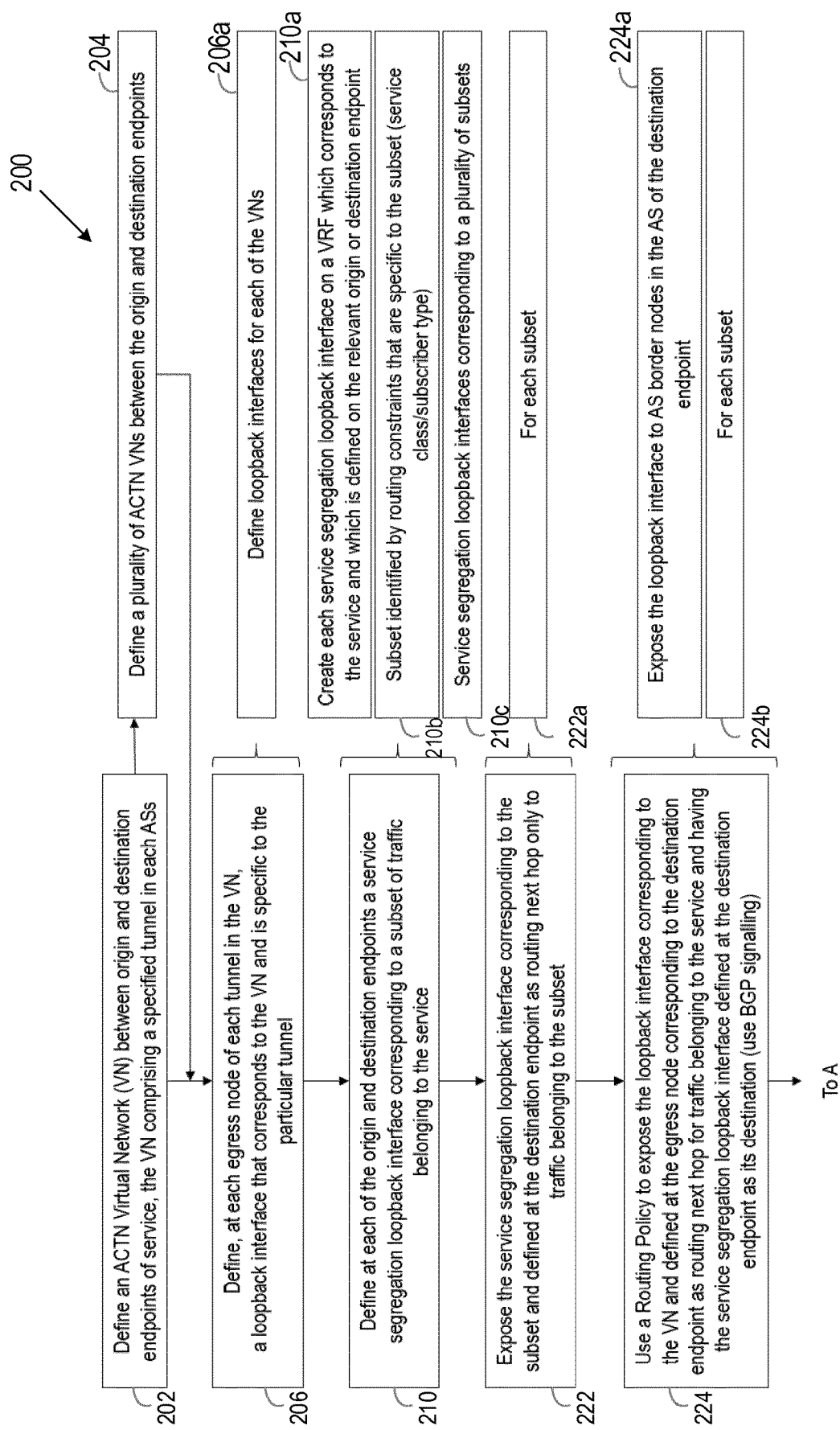
FIGS. 8A and 8B illustrate process steps in another example of a method for managing the provision of a service between origin and destination endpoints over a communication network.
Figure 8B:
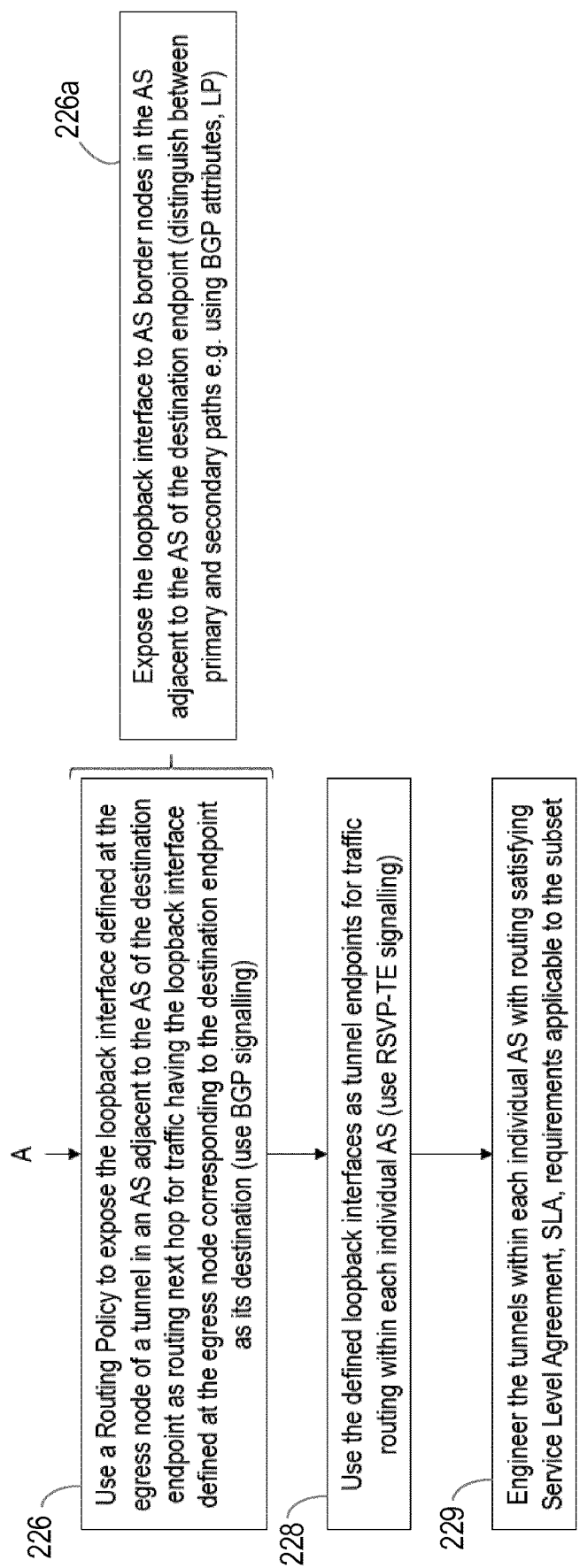
Figure 9:
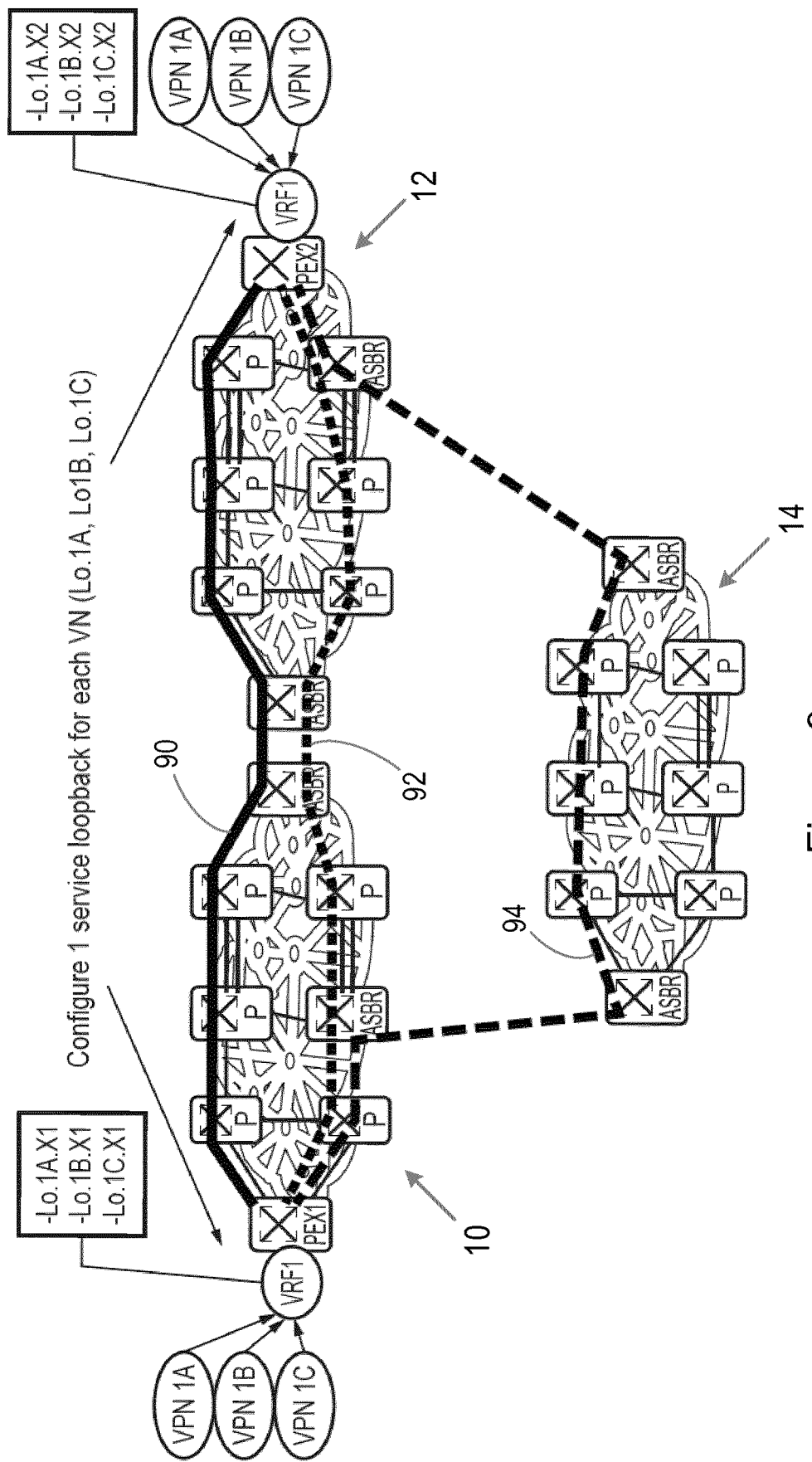
FIG. 9 illustrates mapping of subsets of traffic in a VPN to different VNs in the multi domain network of FIGS. 2 and 3.
Figure 10:
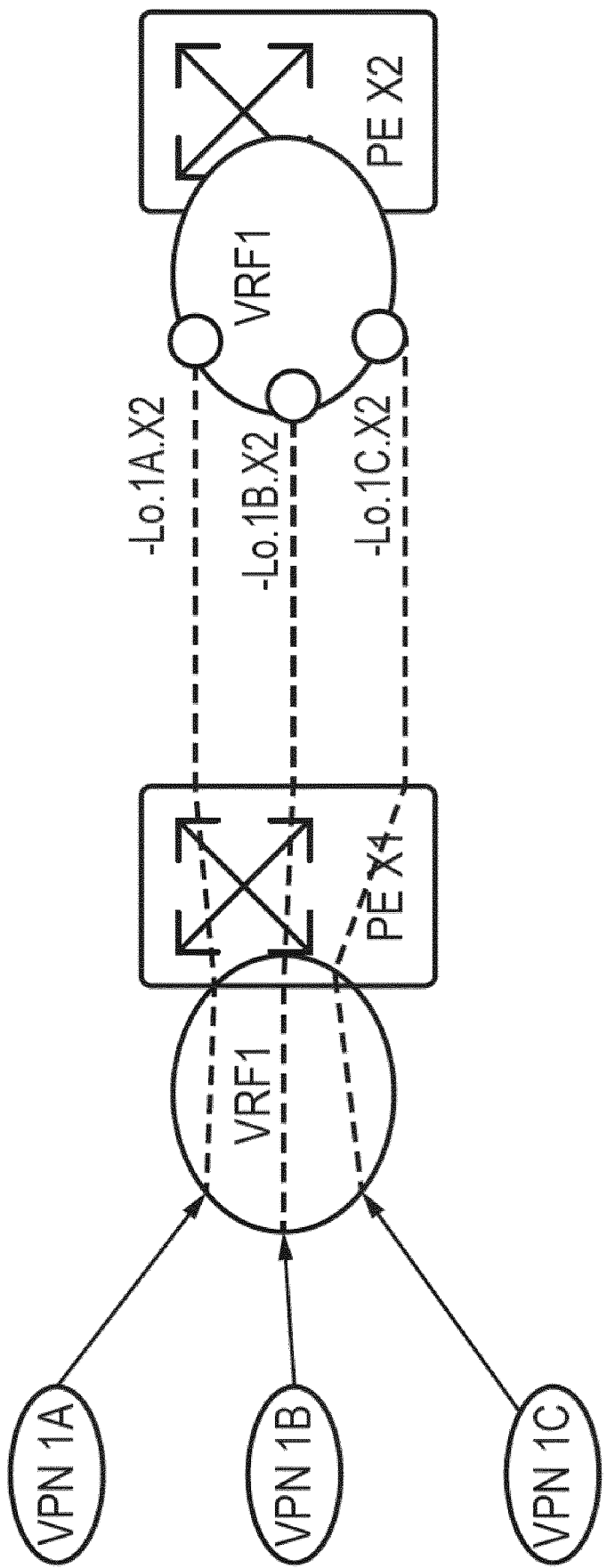
FIG. 10 illustrates service segregation on a Virtual Routing Function.

FIGS. 8A and 8B illustrate another example of a method 200 for managing the provision of a service between origin and destination endpoints over a communication network, the communication network comprising at least two ASs. The method 200 of FIGS. 8A and 8B illustrates one way in which the steps of the method 100 of FIG. 7 may be subdivided and supplemented to achieve the above discussed and additional functionality. The method 200 may for example be carried out by a PNC or an MDSC, such as the PNCs 86, 88 or MDSC 84 illustrated in FIG. 4. FIGS. 9 and 10 illustrate example execution of some of the steps of the method 200 on FIGS. 8A and 8B in the example multi domain transport network of FIGS. 2 and 3.

Referring to FIG. 8A, in a first step 202, the method 200 comprises defining an ACTN VN between origin and destination endpoints, the VN comprising a specified tunnel in each AS. As illustrated in step 204, the method may comprise defining a plurality of ACTN VNs between the origin and destination endpoints. Referring to FIG. 9, this step may for example comprise defining VNs 90 and 92, which traverse ASs 10 and 12, and VN 94, which traverses ASs 10, 14 and 12. In step 206, and 206*a*, the method comprises defining, at each egress node of each tunnel in the or each VN, a loopback interface, referred to in the following description as a loopback interface, which loopback interface corresponds to the VN and is specific to the particular tunnel of the egress node. Such interfaces may be defined for each VN that is to be used for binding of a service. The operation of defining loopback interfaces may comprise manual configuration or configuration by a PNC or MDSC. A PNC or MDSC may configure the destination endpoint such that the defined loopback interfaces at the endpoint are announced into the network via a regular BGP network statement with send label request (BGP LU).

In step 210, the method comprises defining, at each of the origin and destination endpoints, a service segregation loopback interface corresponding to a subset of traffic belonging to the service. Step 210 may comprise defining service segregation loopback interfaces corresponding to a plurality of traffic subsets, as shown in step 210*c*. As illustrated at step

210*a*, each service segregation loopback interface may be created on a Virtual Routing Function, VRF, which corresponds to the service and which is defined on the relevant origin or destination endpoint. An example implementation of step 210 is illustrated in FIG. 9, in which traffic on a service VPN1 is to be segregated into three subsets VPN1A, VPN1B and VPN1C. Three service segregation loopback interfaces are therefore created on each of the origin and destination endpoints for VPN1.

Specifically, Lo.1A.X1, Lo.1B.X1 and Lo.1C.X1 are created on each instance of VRF1. VRF1 is bound to the service VPN1 and an instance of VRF1 is defined on the origin endpoint PE X1. Similarly, Lo.1A.X2, Lo.1B.X2 and Lo.1C.X2 are created on the instance of VRF1 which is defined on the destination endpoint PE X2.

As illustrated in step 210*b*, subsets of traffic belonging to the service may be identified by routing constraints for the subset of traffic that are specific to the subset of traffic. Such routing constraints may include for example shortest path, minimum delay, high bandwidth and/or a requirement to pass through certain functions such as NAT, SASN, MSP etc. The routing constraints may be determined by at least one of a class of service to be guaranteed for the traffic and/or a type of subscriber generating the traffic. Thus it may be desirable to segregate traffic on a VPN into traffic originating from public and private IP address, and/or to segregate according to traffic type, including voice, video etc.

Referring again to FIG. 8A, in step 222, the method comprises exposing the service segregation loopback interface corresponding to a particular traffic subset and defined at the destination endpoint as routing next hop only to traffic belonging to that subset. As illustrated in step 222*a*, this may be performed for each subset. FIG. 10 illustrates how in the example service VPN1, traffic is segregated on PE X1 into VPN1A, VPN1B and VPN1C using for example a Policy Based Routing (PBR) mechanism or an Access Control List Based Forwarding (ABF). This segregation is achieved by the exposing in step 222 of the service segregation loopback interfaces on the destination endpoint PE X2 (Lo.1A.X2, Lo.1B.X2 and Lo.1C.X2) as routing next hop for traffic belonging to the relevant subsets.

An example configuration using ABF is provided below, with comments in italic providing additional explanation with reference to the example of FIGS. 9 and 10:

ipv4 access-list 101/this command creates the ACL on PE X1
    10 permit ipv4 any any dscp ef nexthop1 ipv4 10.5.1.2/inside the ACL any IPv4 packet having cliff serv code point (DSCP) equal to ef (expedited forwarding) is forwarded to 10.5.1.2 as next hop, which is the service loopback Lo.1A.X2 on PE X2.
    20 permit ipv4 any any dscp range af31 af33 nexthop1 ipv4 10.5.1.4/a different service loopback (10.5.1.4=Lo.1B.X2) is configured for the traffic with DSCP matching the classes of service between AF31 and AF33 (assured forwarding).
    30 permit ipv4 any any dscp CS1 nexthop1 ipv4 10.5.1.6/the third class of service (CS1) is sent to (10.5.1.6=Lo.1C.X2) using the third VN.

Referring again to FIG. 8A, in step 224, the method comprises using a Routing Policy to expose the loopback interface corresponding to the VN and defined at the egress node corresponding to the destination endpoint as routing next hop for traffic belonging to the service and having the service segregation loopback interface defined at the destination endpoint as its destination. As illustrated in step 224*a*, this may comprise exposing the loopback interface to AS border nodes in the AS of the destination endpoint. As illustrated in step 224*b*, step 224 may be carried out for each traffic subset. Step 224 may comprise a PNC or MDSC forcing exposure of the loopback interface corresponding to the VN as BGP next hop via route policy on IPv4 labelled unicast address family (match on Route Target and imposed next hop from step 222). It will be appreciated that exposure only to AS border nodes means the defined loopback interfaces are not propagated into each domain IGP, thus ensuring scalability, separation of transport and service layer routing and ease of troubleshooting.

Referring now to FIG. 8B, in step 226, the method 200 comprises using a Routing Policy to expose the loopback interface defined at the egress node of a tunnel in an AS adjacent to the AS of the destination endpoint as routing next hop for traffic having the loopback interface defined at the egress node corresponding to the destination endpoint as its destination. As illustrated in step 226*a*, this may comprise exposing the loopback interface to AS border nodes in the AS adjacent to the AS of the destination endpoint. This may be done by configuring the route policy on the ASBR nodes on IPv4 LU (match on destination). In the event that primary and secondary paths have been defined for a particular VN, BGP Local Preferences may be used to distinguish between primary and secondary path tunnels.

An example Routing Policy configuration is provided below, with comments in italic providing additional explanation with reference to the example of FIGS. 9 and 10 and the example ACL created in the configuration discussed above:

- route-policy nhs-vpn-out /command to bind each VPNx to the desired VN
  - if extcommunity rt matches-any (100:100) and destination in (10.5.1.2/32) then 'command used to check if the route target matches the route target of the VPN and the destination address (next hop of the packet belonging to VPN1A) is the service loopback just defined (Lo.1A.X2)
      set next-hop 5.5.5.2 /if the statement above is true, the next hop is set to the loopback interface that identified the VN to be used to reach Lo.1A.X2
      end if
  - if extcommunity rt matches-any (100:100) and destination in (10.5.1.4/32) then /same as above for VPN 18 using Lo.18.X2
      set next-hop 5.5.5.4
      end if
  - if extcommunity rt matches-any (100:100) and destination in (10.5.1.6/32) then /same as above for VPN 1C using Lo.1C.X2
      set next-hop 5.5.5.6
      end if
- pass
  end-policy In order to have the loopback interfaces installed in BGP tables and relevant labels created, they need to be valid BGP next hops, that is they need to be reachable via IGP protocol. Instead of directly injecting the loopback interfaces into local IGP, the loopback interfaces are resolved not via simple static routes, but by means of dedicated local transport tunnels. In step 228, the method 200 therefore creates tunnels using the defined loopback interfaces as their endpoints. This can be achieved for example using "RSVP autoroute destination" functionality or similar standard RSVP-TE capabilities. As a result, loopback interfaces are made available in local IGP routing tables without explicit redistribution, and traffic is deterministically conveyed over the desired path. A deterministic correlation is thus created between inter-domain BGP and intra-domain transport layers, only using standard IP/MPLS functionalities. As illustrated in step 229 of method 200, each tunnel is engineered with the desired explicit routing satisfying SLA requirements applicable to the subset of traffic to be bound to the VN.

In the methods of PCT/EP2017/050994, the mapping between an ACTN VN and a service such as a VPN is 1:1, and traffic may therefore be forwarded based on the Route target of the VPN. In contrast, as discussed above, according to the method 200, traffic is forwarded on the basis of the combination of the Route Target corresponding to the VPN and the traffic segregation, that is the next hop imposed at step 222. A subset of traffic belonging to a service is therefore bound to the relevant VN by configuring the route policy on the VPNv4 address family (match on ext-community router target and destination address) and exposing the service segregation loopback interface defined at the destination endpoint as next hop only for traffic belonging to the subset that is to be bound to the VN. The route policy on the VPNv4 address family may be dynamically configured, such that if a new subset is created, specific route policies may be created by the control plane in order to expose needed service segregation loopback interfaces and associate the subset to the desired VN.

Figure 11:
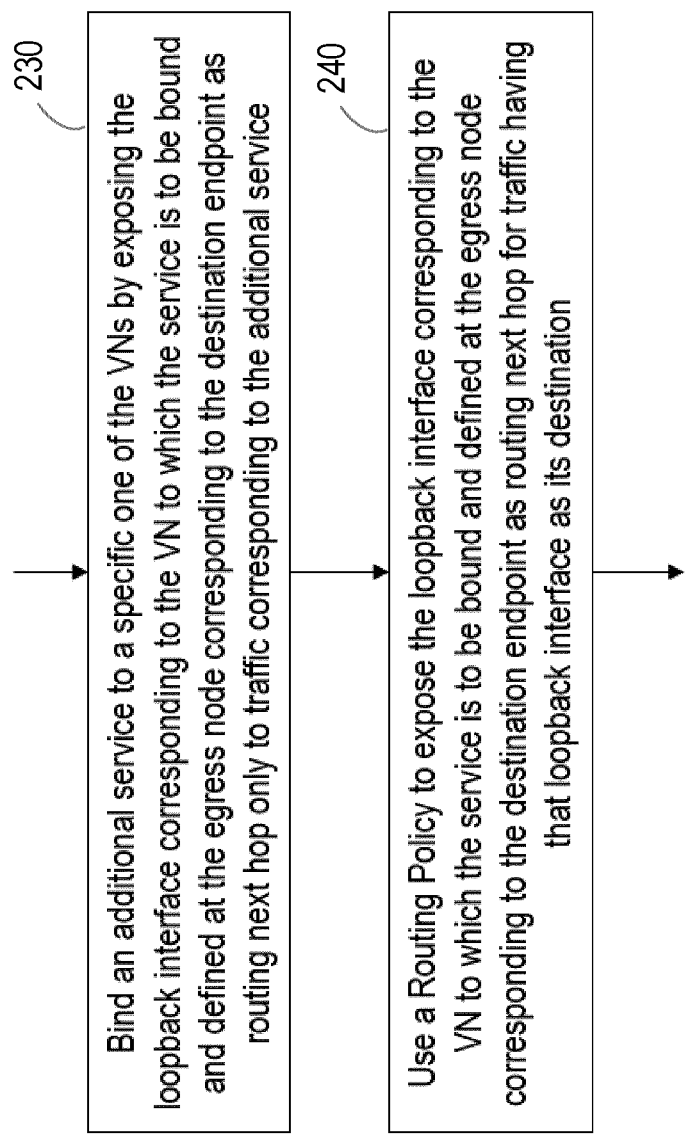
FIG. 11 illustrates additional process steps which may be carried out as part of the method of FIGS. 8A and 8B.

According to examples of the present disclosure, the methods 100, 200 of the present disclosure may operate concurrently with the methods disclosed in PCT/EP2017/050994. Thus, multiple VPNs may be bound to one or more VNs in a transport network, with one or more of the VPNs being segregated, and so having traffic subsets bound to specific VNs, and other VPNs being unsegregated, with the entire VPN bound to a single tunnel. FIG. 11 illustrates additional steps which may be carried out as part of the method 200 to bind an additional service, such as an additional, unsegregated VPN, to one of the ACTN VNs of the architecture established in steps 202, 204 and 206 of the method 200.

Referring to FIG. 11, the method 200 may further comprise the step 230 of binding the additional service to a specific one of the VNs by exposing the loopback interface corresponding to the VN to which the service is to be bound and defined at the egress node corresponding to the destination endpoint as routing next hop only to traffic corresponding to the additional service. Binding the additional service to a specific one of the VNs may further comprise, in step 240, using a Routing Policy to expose the loopback interface corresponding to the VN to which the service is to be bound and defined at the egress node corresponding to the destination endpoint as routing next hop for traffic having that loopback interface as its destination.

Figure 12:
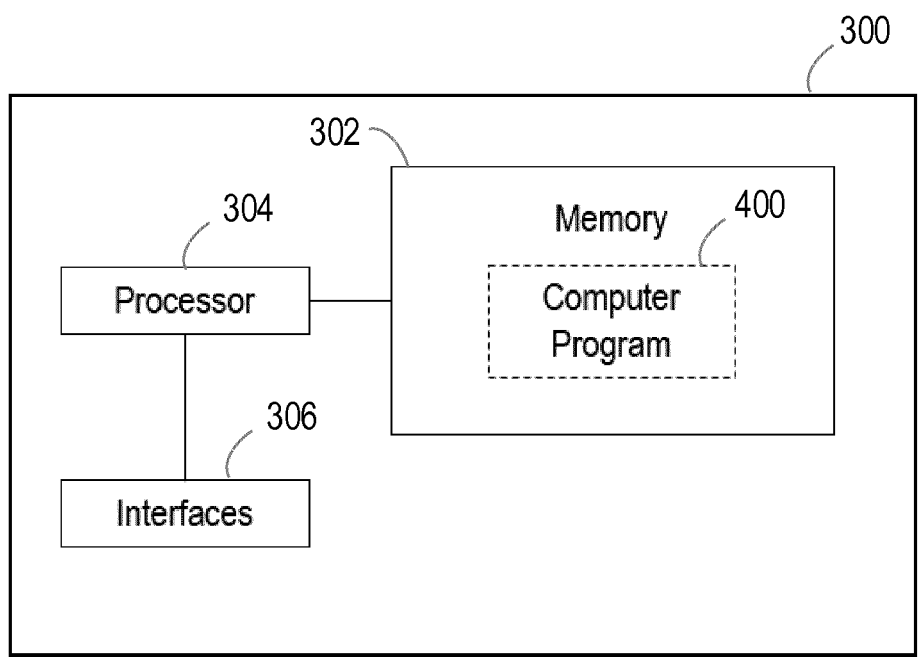
FIG. 12 illustrates functional modules in a management element.

As discussed above, the methods 100, 200 may be performed by a PNC or MDSC which may be hosted within a management element. The management element may be virtualised and may be centralised or distributed as appropriate. FIG. 12 is a block diagram illustrating an example management element 300 which may implement the methods 100, 200 according to examples of the present disclosure, for example on receipt of suitable instructions from a computer program 400. Referring to FIG. 12, the apparatus comprises a processor or processing circuitry 304, a memory 302 and interfaces 306. The memory 302 contains instructions, for example in the form of a computer program, executable by the processor 304 such that the management element is operative to conduct the steps of the method 100 and or 200.

Figure 13:
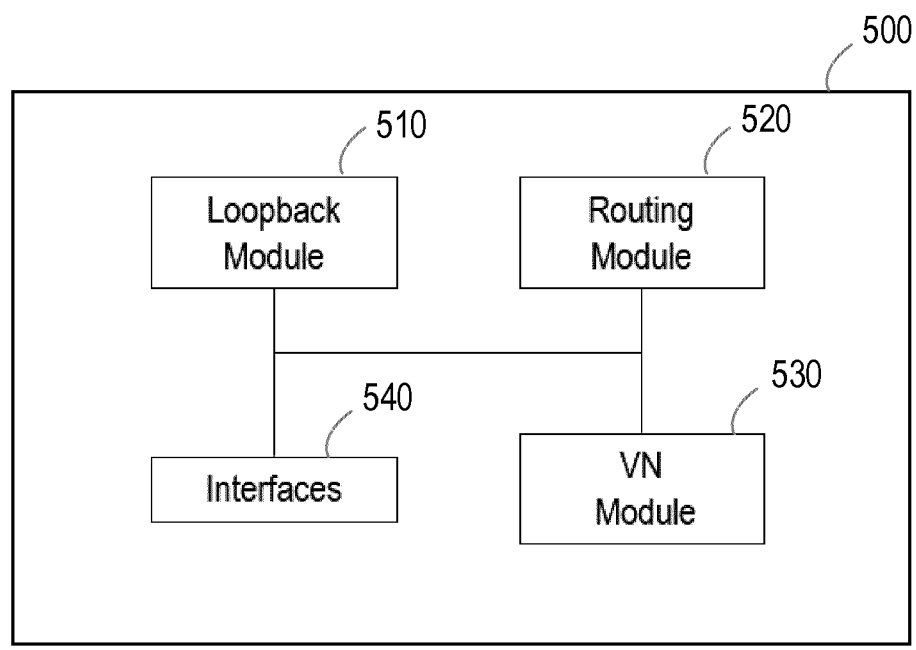
FIG. 13 illustrates functional modules in another example of management element.

FIG. 13 illustrates functional modules in another example of management element 500 which may execute examples of the methods 100, 200 of the present disclosure, for example according to computer readable instructions received from a computer program. It will be understood that the modules illustrated in FIG. 13 are functional modules and may be realised in any appropriate combination of hardware and/or software. The modules may comprise one or more processors and may be integrated to any degree.

Referring to FIG. 13, the management element 500 comprises a loopback module 510 for defining, at each of origin and destination endpoints for a service, a service segregation loopback interface corresponding to a subset of traffic belonging to the service. The management element further comprises a routing module 520 for binding the subset of traffic to a VN by exposing the service segregation loopback interface defined at the destination endpoint as routing next hop only to traffic belonging to the subset. The management element 500 may further comprise a VN module 530 for defining an ACTN VN between the origin and destination endpoints, the VN comprising a specified tunnel in each of the ASs. The loopback module 510 may also be for defining, at each egress node of each tunnel in the VN, a loopback interface that corresponds to the VN and is specific to the particular tunnel. The management element may further comprise interfaces 540.

Aspects of the present disclosure thus provide methods and apparatus enabling the binding of a subset of service traffic to all the different tunnels composing an end to end path in a multi domain transport network. Methods according to the present disclosure allow for the binding of a subset of service traffic to a defined VN, which binding translates as a binding of the subset to each tunnel in the VN across the different ASs spanned by the VN. By enabling the binding of a subset of service traffic to a VN, aspects of the present disclosure provide the possibility to treat different types of traffic within a single service such as a VPN in different ways. Different types of traffic may be associated to different subsets within the VPN and be bound to different VNs, so following different paths within the transport network with different guaranteed constraints including bandwidth, delay, diversity etc.

Aspects of the present disclosure may use standard routing policy functionality of BGP or any similar protocol to manipulate the way in which routing information is advertised though a multi AS environment. According to aspects of the present disclosure, routing policies may be used to define loopback interfaces that force traffic onto particular tunnels, and then to expose those interfaces as next hops only for traffic that is to be bound to those particular tunnels.

As noted above, aspects of the present disclosure may use standard IP/MPLS methods (including for example BGP route policy and Traffic Engineering) thus ensuring their compatibility with existing mechanisms and provide stricter service to transport correlation than simple QoS criteria without invoking any vendor specific tunnel policy feature. Aspects of the present disclosure may be easily applicable to High Availability deployments (i.e. redundant ASBR's), once again with standard IP tools (i.e. BGP Local Preference).

Example methods of the present disclosure enable guaranteed satisfaction of end to end SLAs and also enable a significant reduction in the number of physical ports on the PE node facing the CE node, with consequent capital expenditure reduction. In addition, examples of the present disclosure may reduce the number of VPNs required by a client, thanks to the possibility of treating different traffic within the same VPN in different ways. The reduction in the number of VPNs required leads to a reduction in operational expenditure and energy consumption within the PE node, and also to an increase in the potential for scalability. Example methods of the present disclosure are compatible with existing inter AS mechanisms, including the seamless MPLS architecture, and rely on standard BGP route policy and Traffic Engineering methods without using vendor specific policies or features. Examples of the present disclosure also allow the flexibility of having both VPNs that are segregated into different traffic subsets and VPNs that are not segregated, with all traffic on the VPN bound to a single ACTN VN.

The methods of the present invention may be implemented in hardware, or as software modules running on one or more processors. The methods may also be carried out according to the instructions of a computer program, and the present invention also provides a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for managing the provision of a service between origin and destination endpoints over a communication network, the communication network comprising at least two Autonomous Systems (ASs) and a first Abstraction and Control of Traffic Engineered Networks (ACTN) Virtual Network (VN) between the origin and destination endpoints, the method comprising:
    defining, at the destination endpoint, a first service segregation loopback interface corresponding to a first subset of traffic belonging to the service;
    defining, at the origin endpoint, a second service segregation loopback interface corresponding to the first subset of traffic belonging to the service; and
    binding the first subset of traffic to the first VN, wherein binding the first subset of traffic to the first VN comprises exposing the first service segregation loopback interface defined at the destination endpoint as routing next hop only to traffic belonging to the first subset of traffic belonging to the service.

2. The method of claim 1,
wherein
the communication network comprises a first AS and a second AS,
the first VN comprises a first tunnel in the first AS, the first tunnel having an egress node, and
the method further comprises defining, at the egress node of the first tunnel, a first loopback interface that corresponds to the first VN and is specific to the first tunnel.

3. The method of claim 2, wherein binding the first subset of traffic to the first VN further comprises:
    using a Routing Policy to expose the first loopback interface that corresponds to the first VN as routing next hop for traffic belonging to the service and having the first service segregation loopback interface defined at the destination endpoint as its destination.

4. The method of claim 1, wherein defining the first service segregation loopback interface comprises creating the first service segregation loopback interface on a Virtual Routing Function (VRF) which corresponds to the service and which is defined on the destination endpoint.

5. The method of claim 1, wherein the first subset of traffic belonging to the service is identified by routing constraints for the first subset of traffic that are specific to the first subset of traffic.

6. The method of claim 3, wherein the operation of exposing comprises exposing the loopback interface to AS border nodes in the AS of the destination endpoint.

7. The method of claim 3, wherein binding the first subset of traffic to the first VN further comprises using a Routing Policy to expose the loopback interface defined at the egress node of a tunnel in an AS adjacent to the AS of the destination endpoint as routing next hop for traffic having the loopback interface defined at the egress node corresponding to the destination endpoint as its destination.

8. The method of claim 7, wherein the operation of exposing comprises exposing the loopback interface to AS border nodes in the AS adjacent to the AS of the destination endpoint.

9. The method of claim 1, wherein exposing loopback interfaces comprises exposing the interfaces via Border Gateway Protocol signaling.

10. The method of claim 1, wherein binding the first subset of traffic to the first VN further comprises using the defined loopback interfaces as tunnel endpoints for traffic routing within each individual AS.

11. The method of claim 10, wherein binding the first subset of traffic to the first VN further comprises engineering the tunnels within each individual AS with routing satisfying Service Level Agreement, SLA, requirements applicable to the first subset of traffic.

12. The method of claim 1, further comprising:
    defining a plurality of ACTN VNs between the origin and destination endpoints, each VN comprising a specified tunnel in each of the ASs;
    defining, at each egress node of each tunnel in each VN, a loopback interface that corresponds to the VN and is specific to the particular tunnel; and
    managing the provision of an additional service between the origin and destination endpoints, wherein the step of managing the provision of the additional service between the origin and destination endpoints comprises binding the additional service to a specific one of the VNs by: exposing the loopback interface corresponding to the VN to which the service is to be bound and defined at the egress node corresponding to the destination endpoint as routing next hop only to traffic corresponding to the additional service.

13. A computer program product comprising non-transitory computer readable media having stored thereon a computer program which, when executed on at least one processor, causes the at least one processor to carry out the method of claim 1.

14. A management element for managing the provision of a service between origin and destination endpoints over a communication network, the communication network comprising at least two Autonomous Systems (ASs) and a first Abstraction and Control of Traffic Engineered Networks (ACTN) Virtual Network (VN) between the origin and destination endpoints, the management element comprising a processor and a memory, the memory containing instructions executable by the processor such that the management element is operable to:
- define, at the destination endpoint, a first service segregation loopback interface corresponding to a first subset of traffic belonging to the service;
- define, at the origin endpoint, a second service segregation loopback interface corresponding to the first subset of traffic belonging to the service; and
- bind the first subset of traffic to the first VN by performing a process that includes:
- exposing the first service segregation loopback interface defined at the destination endpoint as routing next hop only to traffic belonging to the first subset of traffic belonging to the service.

15. The management element of claim 14, wherein
the communication network comprises a first AS and a second AS,
the first VN comprises a first tunnel in the first AS, the first tunnel having an egress node, and
the management element is further configure to define, at the egress node of the first tunnel, a first loopback interface that corresponds to the first VN and is specific to the first tunnel.

16. The management element of claim 14, wherein in binding the first subset of traffic to the first VN the management element is further operable to:
- use a Routing Policy to expose the first loopback interface that corresponds to the first VN as routing next hop for traffic belonging to the service and having the first service segregation loopback interface defined at the destination endpoint as its destination.

17. The management element of claim 14, wherein the management element is configured to define the first service segregation loopback interface by creating the first service segregation loopback interface on a Virtual Routing Function (VRF) which corresponds to the service and which is defined on the destination endpoint.

18. The management element of claim 14, wherein the first subset of traffic belonging to the service is identified by routing constraints for the first subset of traffic that are specific to the first subset of traffic.

19. The management element of claim 14, wherein in binding the first subset of traffic to the first VN the management element is further operable to use the defined loopback interfaces as tunnel endpoints for traffic routing within each individual AS.

20. The method of claim 1, further comprising:
- defining a second VN between the origin endpoint and the destination endpoint;
- defining, at the destination endpoint, a third service segregation loopback interface corresponding to a second subset of traffic belonging to the service;
- defining, at the origin endpoint, a fourth service segregation loopback interface corresponding to the second subset of traffic belonging to the service; and
- binding the second subset of traffic to the second VN, wherein binding the second subset of traffic to the second VN comprises exposing the third service segregation loopback interface defined at the destination endpoint as routing next hop only to traffic belonging to the second subset of traffic belonging to the service.

21. The method of claim 20, wherein
the communication network comprises a first AS and a second AS,
the first VN comprises a first tunnel in the first AS,
the first tunnel has an egress node,
the second VN comprises a second tunnel in the first AS,
the second tunnel has an egress node,
the second tunnel is different than the first tunnel, and
the method further comprises:
- defining, at the egress node of the first tunnel, a first loopback interface that corresponds to the first VN and is specific to the first tunnel; and
- defining, at the egress node of the second tunnel, a second loopback interface that corresponds to the second VN and is specific to the second tunnel.

* * * * *